June 3, 1941.                H. L. NICHOLS, JR                    2,244,471
           VALVE MEANS FOR HYDRAULICALLY TILTABLE BULLDOZERS
                   Filed July 18, 1939              3 Sheets-Sheet 1
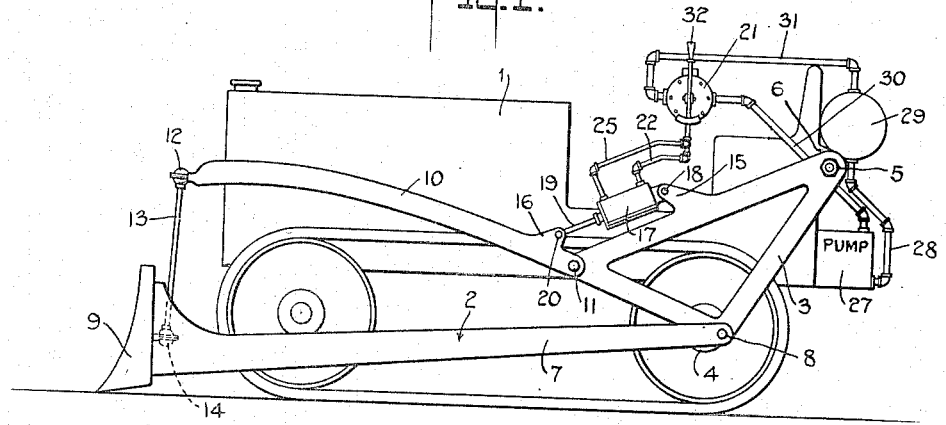
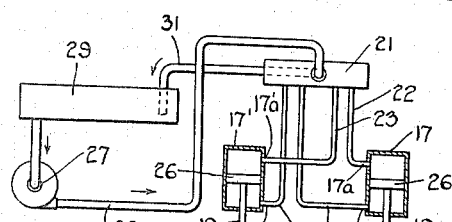
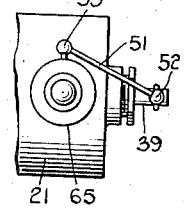
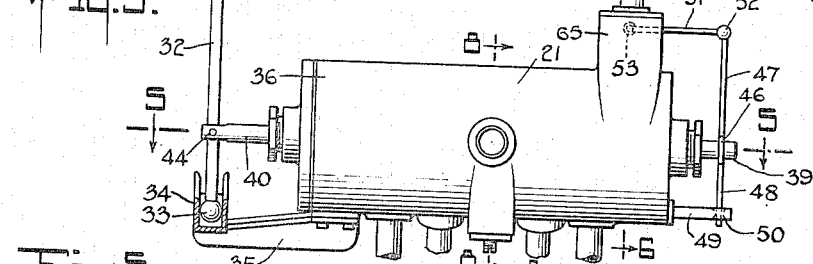
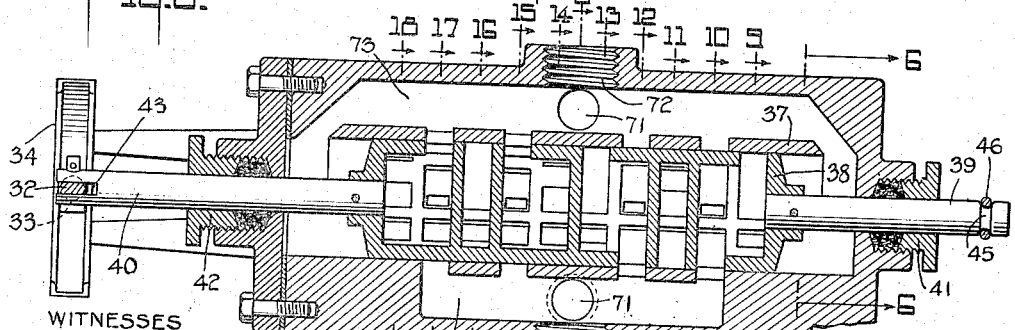
WITNESSES
INVENTOR
Herbert L. Nichols, Jr.
BY
Murry, Anderson & Liddy
ATTORNEYS June 3, 1941.    H. L. NICHOLS, JR    2,244,471
VALVE MEANS FOR HYDRAULICALLY TILTABLE BULLDOZERS
Filed July 18, 1939    3 Sheets-Sheet 2
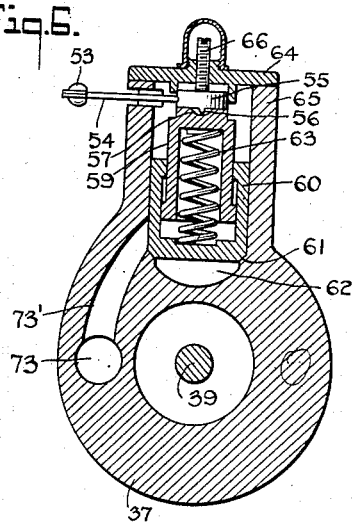
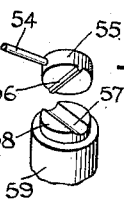
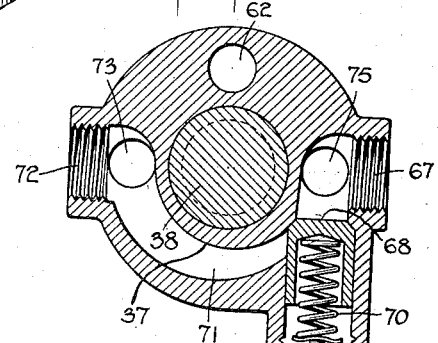
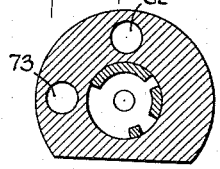
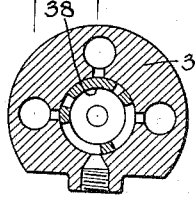
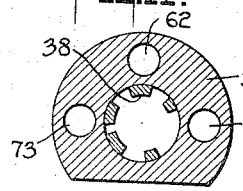
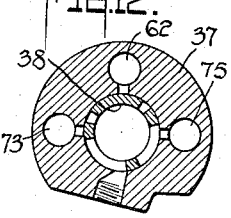
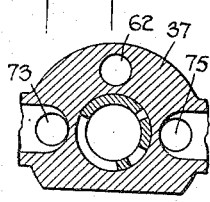
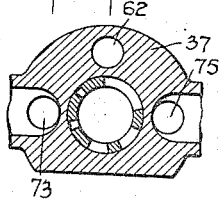
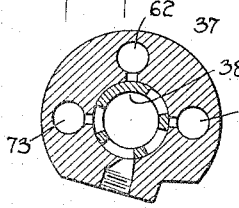
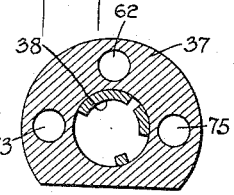
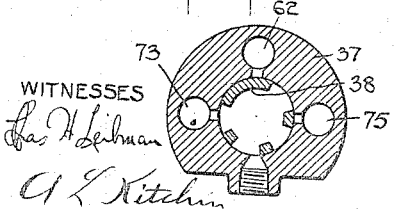
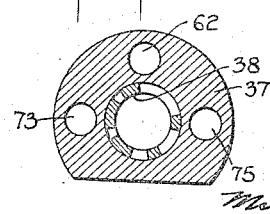
WITNESSES
INVENTOR
Herbert L. Nichols, Jr
BY
ATTORNEYS

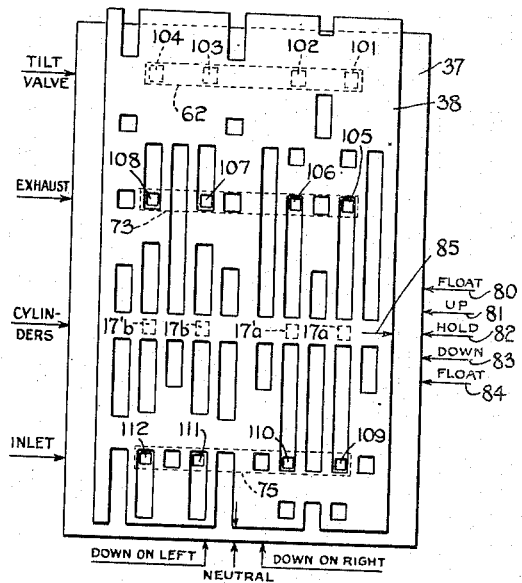
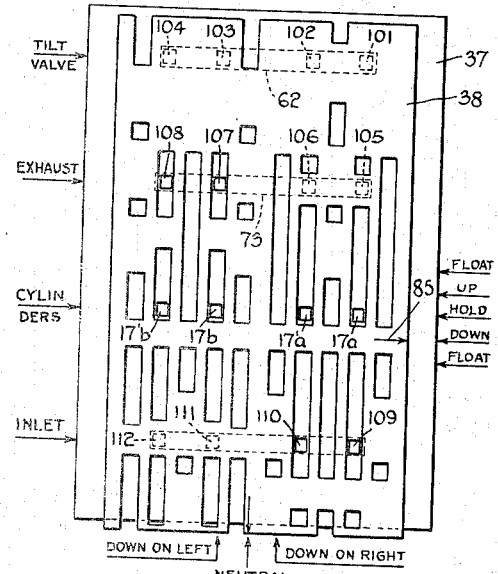
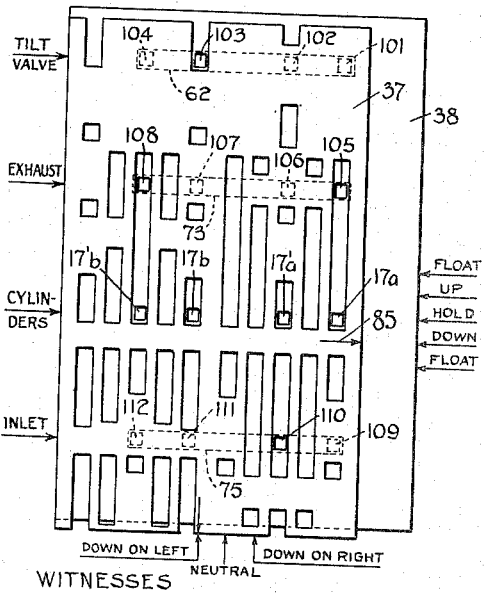
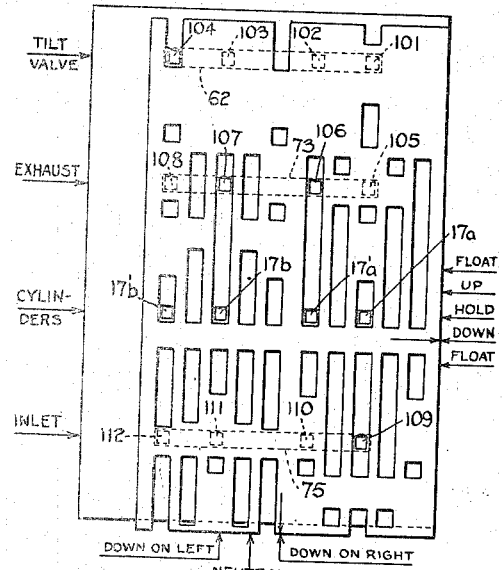

Patented June 3, 1941

2,244,471

UNITED STATES PATENT OFFICE 2,244,471

VALVE MEANS FOR HYDRAULICALLY TILTABLE BULLDOZERS

Herbert L. Nichols, Jr., Greenwich, Conn.

Application July 18, 1939, Serial No. 285,117

9 Claims. (Cl. 277—55)

An object of the invention is to provide a valve mechanism operatively associated with the blade of a bulldozer for tilting the blade in either direction to any desired extent and to raise and lower the blade while in a tilted position through the use of the usual lever and controls for raising and lowering the blade.

An additional and more specific object is to provide a valve mechanism to which a single control lever is connected, designed to control the movement of the liquid which actuates the blade-actuating means whereby the blade may be raised or lowered, or tilted in either direction while in the float position or while being raised or lowered.

In the accompanying drawings—

Fig. 1 is a side view of a hydraulically tiltable bulldozer constructed in accordance with the present invention;

Fig. 2 is a diagram partly in section showing a hydraulic system used in the structure shown in Fig. 1;

Fig. 3 is a side view of the control valve shown in Fig. 1, the same being on an enlarged scale;

Fig. 4 is a top plan view of the right-hand end of the structure shown in Fig. 3;

Fig. 5 is a longitudinal horizontal sectional view through Fig. 3 on the line 5—5, the same being on an enlarged scale;

Fig. 6 is a transverse sectional view on the line 6—6 through Figs. 3 and 5;

Fig. 7 is a detail perspective view of an automatically adjustable mechanism of the tilting valve shown in Fig. 6;

Fig. 8 is a sectional view on the line 8—8 through Figs. 3 and 5;

Figs. 9, 10, 11, 12, 13, 14, 15, 16, 17 and 18 are transverse sectional views through Fig. 5 on the respective lines 9—9, 10—10, 11—11, 12—12, 13—13, 14—14, 15—15, 16—16, 17—17 and 18—18;

Fig. 19 is a development of the valve shown in Figs. 3 and 5 when in a central position;

Fig. 20 is a view similar to Fig. 19 but showing the core of the valve in a new position, namely, a partly rotated position from that shown in Fig. 19;

Fig. 21 is a view similar to Fig. 20 but showing the core shifted longitudinally in one direction; and Fig. 22 is a view similar to Fig. 21 but showing the valve core shifted in the opposite direction to the position shown in Fig. 21.

Referring to the accompanying drawings by numerals, 1 indicates a tractor of any desired kind, as, for instance, any well-known tractor now on the market. To the tractor 1 is connected a bulldozer structure 2, also of a well-known construction now on the market. The structure 2 includes a triangular shaped member 3 on each side of the tractor 1 connected in any suitable way at 4 to the rear axle casing and at 5 to the housing 6. The arm 7 is pivotally connected at 8 to the member 3 and at the front carries the bulldozer blade 9. A swinging arm 10 is pivotally connected at 11 to member 3 and by a ball-and-socket structure 12 to a vertically disposed rod 13. The rod 13 is connected by a ball-and-socket structure 14 to the blade 9 near arm 2. Arms similar to arms 7 and 10 are arranged on the opposite side of the tractor 1 and also a rod 13 and associated parts are arranged on the opposite side and connected with the blade 9. It will be understood that both sides of the bulldozer are identical and the construction of the bulldozer is old and well known.

The triangular member 3 is provided with an extension 15, while the arm 10 is provided with an extension 16. A cylinder 17 is pivotally connected at 18 to the extension 15 and connected through piston rod 19 to extension 16 by a suitable pivot pin 20. On the opposite side of the tractor 1 a similar arrangement is provided so that there will be presented cylinders 17 and 17' functioning to manipulate the respective arms 10 and blade 9. As shown in Fig. 2, it will be understood that the cylinders 17 and 17' are identical but on opposite sides of the tractor 1 and are connected to the control valve 21 by the respective pipes 22, 23, 24 and 25. Pipes 22 and 23 connect the valve 21 to the upper end of the respective cylinders and pipes 24 and 25 connect the valve 21 to the lower end of the cylinders. In cylinder 17 a piston 26 is connected to the piston rod 19 to cause the piston rod to reciprocate under desired pressure. An identical structure is provided for the cylinder 17'.

A pump 27 of any desired construction is connected to the casing 6 and through the pipe 28 to a tank 29, and through pipe 30 to the valve 21. A return pipe 31 connects valve 21 with the top of tank 29. The pump 27 is connected to the engine of the tractor 1 in a well-known way and this pump has been used heretofore with the old form of valve and piping system. In the present invention the same pump as heretofore used is utilized for providing liquid under pressure to valve 21 and to the respective cylinders 17 and 17'. When, for instance, liquid is passing from valve 21 through pipes 22 and 23 into the upper end of the cylinders 17 and 17', liquid will be passing from the lower end of the cylinders through pipes 24 and 25 to the valve 21 and through the return pipe 31 to the tank 29. Also while this is taking place, the pump 27 will be forcing oil or other liquid through the pipe 30 to valve 21. When this takes place the blade 9 will be forced downwardly and if the pressure is left on, the blade 9 will be held in its lowered position. When it is desired to raise the blade, valve 21 is adjusted to cause the pipes 22 and 23 to exhaust into valve 21 and thence into return pipe 31, while, at the same time, supplying liquid under pressure to pipes 24 and 25. This will cause the pistons 26 in the respective cylinders to move upwardly simultaneously and to raise the respective arms 10 and thereby raise the blade 9.

By a proper adjustment of the valve 21 through the shifting of the control lever 32 to a correct position, liquid may be forced into either the top or the bottom of cylinder 17, while the piston of cylinder 17′, which is positively connected to the opposite end of the blade 9 as previously described, will resist movement in the direction taken by the piston of cylinder 17 because fluid exhausted by it will have to pass through the tilt valve, a pressure relief valve to be more fully described below. This will cause the end of the blade controlled by cylinder 17 to move upwardly or downwardly, whereas the other end will remain stationary until the torsion of the bulldozer frame, which is of semi-rigid construction, produces sufficient pressure in cylinder 17′ to force fluid through the tilt valve, after which the blade will retain its tilted position, and will move upwardly or downwardly as a unit, retaining its tilted position to the limit of travel, or until the core 38 is changed in position. It will be noted, therefore, that the amount of tilt assumed by the blade 9, independent of external forces, is a result of the rigidity of the bulldozer frame tending to keep it level, and the resistance of the tilt valve tending to tilt it, and since the rigidity of the frame is a constant, in practice the tilt will be determined by the adjustments of the tilt valve hereinafter described.

By changing the seating of the valve 21 through an actuation of lever 32, a reverse action may take place, namely, piston 26 in cylinder 17′ may move the blade upwardly or downwardly while piston 26 in cylinder 17 resists such movement, and thus causes a tilting of the blade.

It will be understood that if the setting of the tilt valve should be zero, or if there should be no tilt valve, the weight of the blade would cause it to tilt somewhat in upward motion due to one sided or unequal pressure, but in downward movement it would remain approximately horizontal until it encountered external resistance at one side of the point of pressure sufficient to tilt it, by which time it might well have damaged the surface to be treated.

It will be further noted that with the valve 21 positioned for tilting in either direction and the core 38 rotated so as to produce an upward or downward movement of the blade, the blade 9 will assume a tilt determined as described above. In reversing from the upward or downward movement aforesaid, leaving other adjustments unchanged, the tilt will remain constant, as the pressure and the opposing resistance remain the same in value. Inasmuch as in operating a bulldozer under certain conditions, it is common practice for the operator to change rapidly and continually from upward to downward motion, and vice versa, the importance of this feature in producing accurate work will be evident.

After the blade 9 has been moved to its highest position, or to its lowest position, or to any intermediate position, lever 32 may be actuated to move the valve 21 to what may be termed a "hold" position, wherein the blade 9 will be held in the desired adjusted position. When the blade is tilted to any elevation the parts may be moved to the "hold" position so that the blade will be held in the desired tilted position.

The control lever 32 is an ordinary lever provided with a ball 33 at the lower end, as shown in Fig. 3, which fits into the U-shaped track 34, whereby the lever 32 may be swung to the right and left or in a direction at right angles thereto. The track 34 is preferably held by a suitable bracket 35 bolted or otherwise rigidly secured to the outer casing 36 of valve 21. The valve 21 is not only provided with an outer casing 36, but also is provided with what may be termed an inner casing or shell 37 and a core 38. A rod 39 is riveted or otherwise rigidly secured coaxially to core 38 at one end and a similar rod 40 is riveted or otherwise rigidly secured coaxially to core 38 at the other end. The rods 39 and 40 extend through the respective packing glands 41 and 42. Rod 40 has a slot 43 through which the lever 32 extends so that the lever may be pivotally connected to rod 40 by a pin 44 extending through the respective parts as shown in Fig. 3. Rod 39 is provided with a groove 45 which accommodates a ring member 46, which ring member is preferably integral with the rod 47 and a rod extension 48. The rod extension 48 extends through a bracket 49 rigidly secured to the outer casing 36 and provided with an aperture 50 flaring from a central point in both directions. The upper end of rod 47 is connected to a horizontal rod 51 by a suitable ball-and-socket connection 52. Rod 51 is connected by a ball-and-socket connection 53 to the rod 54 (Fig. 7) which, in turn, is rigidly secured to a disk 55 having a V-shaped bead 56 normally positioned in the groove 57 of the extension 58 of a tension guide 59 shown in Fig. 6. The wall of the groove 57 is semi-cylindrical. This guide 59 is cylindrical and is slidingly fitted into a cylindrical valve member 60 normally resting on the valve seat 61 so as to close the passageway 62. A spring 63 presses against the bottom part of member 60 and against the upper end of member 59 so as to provide a desired tension for normally holding the valve member 60 seated. An adjusting screw 66 is carried by a plate 64 which is rigidly secured to an extension 65 of the casing 36. The set screw 66 is adapted to press against the upper surface of the disk 55 so as to move the same downwardly and compress the spring 63 to a certain extent to provide a desired tension on the spring.

During the actuation of the device, when the rod 39 is moved to the right or left to a certain extent the disk 55 will be rotated somewhat. If the rotary movement is slight the bead 56 will have sufficient play in the groove 57 to move without accomplishing any result. However, if the movement is sufficient the bead 56 will attempt to climb out of the groove 57 and thereby automatically provide additional tension on the spring 63. By this construction there is provided a constant tension by reason of the position of the set screw 66 and additional tension when the rod 39 has been moved to its extreme position in either direction in response to the manipulation of the lever 32. As rod 39 is moved to its extreme position in either direction, rod 47 will be swung with the bracket 49 as a pivot and, consequently, rod 51 will be moved and this movement will rotate the disk 55 to a certain extent.

It will be understood that Fig. 6 is a transverse sectional view through what may be termed a tilt valve as it is utilized to provide pressure or resistance in tilting the blade 9 as heretofore described. In Fig. 8 a relief valve is shown in section. This valve is a standard valve but arranged in conjunction with the system to relieve any excessive pressure produced by the pump 27 and to by-pass the liquid when the parts are externally stopped in either an up or down position.

As shown in Fig. 8, the liquid enters the port 67 of the casing 36 and acts against the end of a cylindrical spring-pressed valve member 68 operating in said casing. A set screw 69 is used for varying the tension of the spring 70 of the member 68. When the pressure becomes too great the spring 70 will be compressed and the liquid will escape into the passageway 71 and out through the outlet port 72 of the casing 36. From Fig. 8 it will be seen that there are provided three longitudinal passageways, namely, the outlet passageway 73, passageway 62 and the inlet passageway 75. It will be understood that as the pump 27 functions, liquid will be forced through pipe 30 and through the inlet port 67 into passageway 75 from which it is distributed in different ways by the core 38 of the valve 21 according to the particular setting of the core. Any excess pressure as above mentioned will be relieved by member 68 moving out of the way and thus permitting liquid to return to tank 29 through passageway 71, port 72 and pipe 31. The liquid under pressure will leave passageway 75 and enter the various ports of the core 38 and pass to the respective cylinders 17 and 17' as the case may be. While the oil is passing in this direction, oil from other ports of the cylinders 17 and 17' will pass to the core 38 and thence to passageway 73 from which it will be exhausted through port 72 into the return pipe 31. The core 38 in respect to the inner casing 37 is set (as shown in Fig. 5) in what may be termed a central or neutral position and all of the sectional views 9 through 18 are taken with the core in this central position.

When the parts are in the central position, as shown in Fig. 5, lever 32 may be swung in one direction for rotating the shaft 40 and core 38. This will cause the blade 9 to be raised. When the parts are rotated back to their former position, which is the "hold" position, the ports will be closed so that no fluid can enter or leave the respective cylinders 17 and 17'. This will hold the blade 9 raised. By swinging the lever 32 in the opposite direction core 38 will be rotated in the opposite direction and the fluid will flow into the upper end of the cylinders 17 and 17' for forcing down the blade 9. After the blade 9 has been lowered the lever 32 and the core 38 may both be moved back to their former or "hold" position to positively hold the blade 9 lowered. If it is desired to have the blade 9 loose or floating, the core 38 will be moved into what may be termed the floating position, whereby all the fluid is by-passed so as not to cause any pressure to be built up in the respective cylinders. When it is desired to tilt the blade 9 at any desired elevation the lever 32 is swung to the right or left, as shown in Fig. 3, according to the direction of tilting desired. When the lever 32 and core 38 are moved to the right and then rotated as desired in either direction, one end of the blade 9 will be raised or lowered, whereas if the core 38 were moved to the left and then rotated the opposite end of the blade would be tilted upwardly or downwardly as the case may be. After any upward or downward movement or any tilting movement, the valve 21 may be adjusted to the "hold" position wherein the blade 9 will be held in the adjusted position. This is true of all positions of the blade 9 except the floating position, or rather the floating condition.

In order to more clearly visualize how the various parts in the inner casing 37 and core 38 function, developments of these parts have been illustrated in Figs. 19 to 22 inclusive. In the figures just mentioned three different positions of the core 38 are shown and in order to illustrate how the rotation and reciprocation of core 38 causes the opening and closing of different parts to secure the results above set forth, namely, the proper up-and-down movement of the blade 9 and the desired tilting movement from either side. In Fig. 19 the core 38 and casing 37 are illustrated in the same position as shown in Fig. 5, namely, in the central or neutral position. With the parts in the position shown in Fig. 19, all of the ports of the respective cylinders 17 and 17' are closed. The ports in these cylinders, for the purpose of identification, in Fig. 19 are numbered 17a, 17'a, 17b and 17'b. The ports 17a and 17b are in the upper and lower ends respectively of the cylinder 17, whereas the ports 17'a and 17'b are in the upper and lower ends respectively of the cylinder 17'. Similar identifications are shown in Fig. 2, whereby the location of the parts may be clearly seen. When the lever 32 is rotated a certain distance in one direction, the core 38 will be moved correspondingly and in the development shown in Fig. 20 the core 38 has been shifted to the down position, that is, the lowering or down position of blade 9, and all of the ports to the cylinders 17 and 17' will be opened but certain others of the ports of the core 38 are closed by the casing 37 and, therefore, will not function.

In Fig. 21 the core 38 is still in what may be termed the down position and, in addition, has been shifted to the left so that the blade 9 will be tilted as it is lowered with left end lower than the right end. When the parts are shifted to the right, as shown in Fig. 22, the blade 9 will tend to continue in the down direction but will be tilted in the opposite direction.

For the purpose of identification the various ports will be numbered. The top row of ports, as shown in dotted lines in Fig. 19, are arranged in the inner casing 37 and are identified by the numbers 101, 102, 103 and 104. These may be known as the tilt ports and exhaust into passage 62. The second row of ports in the casing 37 from the top of Fig. 19 are numbered 105, 106, 107 and 108. These may be known as exhaust ports and exhaust into the passageway 73. The fourth row of ports from the top in the casing 37 are numbered 109, 110, 111 and 112.

When the core 38 is located in respect to the casing 37, as shown in Fig. 19, the blade 9 is in what may be known as the "hold" position and is positively held stationary against moving upwardly and downwardly or tilted whereby if the tractor moves it may push into the ground so as to remove earth or other material. If desired, after each actuation of the lever 32, the core 38 could be moved to the position shown in Fig. 19, or to the right or left of it, in any of the three "hold" positions, and the blade 9 would be held in the desired adjusted position whether it were raised or lowered, or tilted. As shown in Figs. 19 to 22, inclusive, there are indicating arrows 80, 81, 82, 83 and 84. These arrows indicate certain positions in relation to the arrow 85. When the core 38 is moved so that arrow 85 is opposite arrow 82, the valve will be in the "hold" position. When the arrow is moved in one direction, namely, to arrow 81, the parts will function to raise the blade 9. After the blade 9 has been raised it is usual to bring the core 38 back to the "hold" position as shown in Fig. 19. If the arrow 85 is moved downwardly, as shown in Fig. 20, to arrow 83, the blade 9 will be moved downwardly. If arrow 85 were moved farther downward, as shown in Fig. 19, to the opposite arrow 84, the blade 9 would be in the "float" position, that is, it would be free to move up and down and without any hindrance or help, the same swinging with the arms or levers 2. When the valve is in the float-neutral position it will be observed that all the parts are so disposed that the inlet, cylinder and exhaust ports are all open and fluid from the pump flows freely back to the tank without building up effective working pressure, and that the cylinders open into this stream so that no pressure can be retained in them. This allows the blade 9 to rest freely by its own weight on the ground or other support.

When the valve core 38 is moved longitudinally to either tilt float position equal pressure is supplied to the top of one cylinder and the bottom of the other cylinder while the respective cylinders are exhausting from the ends not receiving the fluid, thus causing the blade 9 to rest on the ground in a tilted position but free to move up and down without any hindrance or help.

In shifting lever 32 the various ports 101 to 112 inclusive will be brought into play at different times and occasionally several ports will be functioning at the same time. When the core 38 is moved to the position shown in Fig. 20 liquid will be flowing from the pump through the ports 17'a and 17a into the upper ends of the cylinders and exhausting from the lower ends of the cylinders out of the ports 17'b and 17b to ports 107 and 108, whereupon the blade 9 will be lowered. If it is desired to hold the blade positively in its lowered position the core 38 is moved back to the position shown in Fig. 19. If it should be desired to raise the blade 9, the core 38 would be moved until the arrow 85 comes opposite arrow 81 and the result would be that liquid would pass into the lower part of cylinders 17 and 17' and exhaust from the upper part of these cylinders. It will therefore be seen that by shifting the core 38, the various parts can be brought into and out of register to cause the fluid to flow simultaneously into the upper end of both cylinders and simultaneously out of the lower end of both cylinders, or the reverse action may take place. In addition, by a proper shifting of the core 38 to float position liquid could be admitted into the lower part of cylinder 17 and the upper part of cylinder 17', whereby a decided tilting action will be produced. Also by sliding the core 38 to the opposite point the reverse action would take place. By other positionings of core 38, pressure can be produced in either part of cylinder 17, while the opposite part of cylinder 17' resists being exhausted; or pressure can be supplied to either part of cylinder 17', while the resistance would be set up in the opposite part of cylinder 17. After each movement of the blade 9 the core 38 could be quickly moved back to the "hold" position and the parts would remain positively in their new or adjusted position.

I claim:
1. In a device of the character described, a valve having an outer casing provided with a pair of substantially longitudinally extending passageways, an inlet port opening into one of said passageways, an outlet port opening into the other passageway, a transverse arc-shaped passageway connecting the first two passageways, a spring closed relief valve in said transverse passageway, means integral with said outer casing forming an inner casing, said inner casing being provided with a plurality of spaced ports, a valve core rotatably and slidably positioned in said inner casing, said valve core being formed hollow and with a plurality of spaced partitions for dividing the core into compartments and a plurality of ports opening into each compartment and a hand-actuated lever for reciprocating and partly rotating said core to cause certain ports in the core to register with certain ports in the outer casing.

2. In a device of the character described, a valve having an outside casing provided with a pair of primary substantially longitudinal passageways, an auxiliary passageway, an inlet port opening into one of said primary passageways, an outlet port opening into the other primary passageway, a by-pass passageway leading from said auxiliary passageway to the primary passageway having the outlet port, a control valve interposed between said auxiliary passageway and said by-pass passageway for controlling the pressure in said auxiliary passageway, and adjustable means for regulating the control valve to determine the pressure necessary to unseat the same.

3. In a device of the character described, a valve having an outside casing provided with a pair of primary substantially longitudinal passageways, an auxiliary passageway, an inlet port opening into one of said primary passageways, an outlet port opening into the other primary passageway, a by-pass passageway leading from said auxiliary passageway to the primary passageway having the outlet port, a control valve interposed between said auxiliary passageway and said by-pass passageway for controlling the pressure in said auxiliary passageway, said control valve having a valve seat, a valve member, a spring for urging said valve member against said seat, a threaded member for varying the tension of said spring, and a hand actuated structure for increasing the tension of said spring, said hand actuated structure including a pair of coacting cam members and a lever structure for actuating one of said cams.

4. In a device of the character described, a valve having an outside casing provided with a pair of primary substantially longitudinal passageways, an auxiliary passageway, an inlet port opening into one of said primary passageways, an outlet port opening into the other primary passageway, means integral with said outer casing forming an inner casing, said inner casing being provided with a plurality of spaced ports, a valve core rotatably and slidably positioned in said inner casing, an extension at each end of said core, said extensions extending through said outside casing, a hand lever acting on one of said extensions for rotating and sliding said core, a lever structure actuated by the other extension when the core is slid longitudinally a predetermined distance, a by-pass passageway leading from said auxiliary passageway to the primary passageway having the outlet port, a control valve interposed between said auxiliary passageway and said by-pass passageway, and a cam structure actuated by said lever structure for controlling the pressure in said auxiliary passageway.

5. In a control valve mechanism for use in a liquid pressure system having a pair of cylinders, a casing, a valve member having reciprocatory and rotatory movement in said casing, a single control member connected with said valve member and manipulatable to impart reciprocatory and rotatory movement to said valve member, said casing having an inlet for the inflow of liquid under pressure thereinto, an outlet for the return flow of the liquid therefrom, a series of ports and passageways communicating with said inlet and outlet respectively, and said valve member having a series of ports therein which cooperate with said ports and passageways in the casing upon the movement of the valve member in response to the manipulation of said control member, whereby liquid may flow into one end of both of said cylinders and flow out of the other end of both cylinders simultaneously or vice versa, and also whereby liquid may flow into the upper end of one cylinder and out of its lower end while liquid may flow into the lower end of the other cylinder and out of its upper end, and in combination a retarding valve controlling certain of said passageways and responsive to resist flow of liquid therein, and means coacting with said valve member and retarding valve whereby the retarding valve is responsive to the movement of said valve member as and for the purpose specified.

6. In a control valve mechanism for use in a liquid pressure system having a pair of cylinders, a casing, a valve member having reciprocatory and rotatory movement in said casing, a single control member connected with said valve member and manipulatable to impart reciprocatory and rotatory movement to said valve member, said casing having an inlet for the inflow of liquid under pressure thereinto, an outlet for the return flow of the liquid therefrom, a series of ports and passageways communicating with said inlet and outlet respectively, and said valve member having a series of ports therein which cooperate with said ports and passageways in the casing upon the movement of the valve member in response to the manipulation of said control member, whereby liquid may flow into one end of both of said cylinders and flow out of the other end of both cylinders simultaneously or vice versa, and also whereby liquid may flow into the upper end of one cylinder and out of its lower end while liquid may flow into the lower end of the other cylinder and out of its upper end, and in combination a retarding valve controlling certain of said passageways.

7. In a control valve for use in a liquid pressure system having a pair of cylinders, a casing, a valve member having reciprocatory and rotatory movement in said casing, a single control member connected with said valve member and manipulatable to impart reciprocatory and rotatory movement to said valve member, said casing having an inlet for the inflow of liquid under pressure thereinto, an outlet for the return flow of the liquid therefrom, a series of ports and passageways communicating with said inlet and outlet respectively, and said valve member having a series of ports therein which cooperate with said ports and passageways in the casing upon the movement of the valve member in response to the manipulation of said control member, whereby liquid may flow into one end of both of said cylinders and flow out of the other end of both cylinders simultaneously or vice versa, also whereby liquid may flow into the upper end of one cylinder and out of its lower end while liquid may flow into the lower end of the other cylinder and out of its upper end, and the valve member having rotatory movement in either direction to set positions in which to establish communication between said inlet and outlet for the free flow of liquid in said system.

8. In a control valve for use in a liquid pressure system having a pair of cylinders, a casing, a valve member having reciprocatory and rotatory movement in said casing, a single control member connected with said valve member and manipulatable to impart reciprocatory and rotatory movement to said valve member, said casing having an inlet for the inflow of liquid under pressure thereinto, an outlet for the return flow of the liquid therefrom, a series of ports and passageways communicating with said inlet and outlet respectively, and said valve member having a series of ports therein which cooperate with said ports and passageways in the casing upon the movement of the valve member in response to the manipulation of said control member, whereby liquid may flow into one end of both of said cylinders and flow out of the other end of both cylinders simultaneously or vice versa, also whereby liquid may flow into the upper end of one cylinder and out of its lower end while liquid may flow into the lower end of the other cylinder and out of its upper end, and the valve member having rotatory movement to a set position in which to close certain of the ports in said casing and thus prevent the flow of liquid into or out of said cylinders.

9. In a control valve for use in a liquid pressure system having a pair of cylinders, a casing, a valve member having reciprocatory and rotatory movement in said casing, a single control member connected with said valve member and manipulatable to impart reciprocatory and rotatory movement to said valve member, said casing having an inlet for the inflow of liquid under pressure thereinto, an outlet for the return flow of the liquid therefrom, a series of ports and passageways communicating with said inlet and outlet respectively, and said valve member having a series of ports therein which cooperate with said ports and passageways in the casing upon the movement of the valve member in response to the manipulation of said control member, whereby liquid may flow into one end of both of said cylinders and flow out of the other end of both cylinders simultaneously or vice versa, also whereby liquid may flow into the upper end of one cylinder and out of its lower end while liquid may flow into the lower end of the other cylinder and out of its upper end, and in combination therewith a pressure relief valve automatically controlling certain of said passageways to eliminate excess pressure in said system, and a retarding valve controlling certain of said passageways to resist the flow of liquid out of said cylinders.

HERBERT L. NICHOLS, Jr.